Patented Dec. 19, 1933

1,939,773

UNITED STATES PATENT OFFICE 1,939,773

COMPOSITION OF MATTER AND METHOD OF MAKING AND USING THE SAME

Mortimer T. Harvey, East Orange, N. J., assignor to The Harvel Corporation, a corporation of New Jersey No Drawing. Application June 28, 1930
Serial No. 464,718

3 Claims. (Cl. 134—26)

The present invention relates to compositions of matter made from the oil of the nuts of the Sterculiaceæ and to methods of making and using the same. The invention further relates to coating materials, impregnating materials, molding compositions, electrical insulation, chemical resistant material, products made from these materials, and materials and products useful in the arts generally somewhat in the nature of those made of shellac, Bakelite, linseed and china wood oils and the like, but, according to the invention, made of the oil of the kernel of the nuts of the Sterculiaceæ.

Species of the Sterculiaceæ useful in the practice of the invention are *Sterculia foetida*, *Sterculia appendiculata*, and *Sterculia chica*. The *Sterculia foetida* is known in the Philippines as the bangar nut. The scientific name of this specie is intended, hereinafter, to include also the other Sterculiaceæ, and will be written *Sterculia f.*

An object of the invention is to provide coating materials for general use and particularly for wrapping food products and having little or no odor.

Another object of the invention is to provide a coating material which is of very light color or colorless and substantially transparent.

Another object of the invention is to provide a method for thickening or drying the nut oil of the *Sterculia f.*

Another object of the invention is to provide a method for bleaching nut oil of the *Sterculia f.*

Other objects and advantages of the invention will be apparent from the specification and claims appended hereto.

Wedemeyer (German Patents 211,030 and 211,043, October 2, 1907) made a rubber-like composition from the nut oil of the Sterculia. According to Wedemeyer, Sterculia oil, upon heating, generates heat spontaneously and requires temperature control; but this was necessary because Wedemeyer was after prolonged heating, to secure his rubber composition.

I have discovered that the Sterculia nut oil can be polymerized at high temperatures to secure new and useful products without running into the thick, rubbery state; and that new and useful products can be made at temperatures lower than those used by Wedemeyer to make his rubbery composition. Various other new and useful characteristics of the products of the invention will appear in the following specification.

As an example of a method of the invention the following is given. *Sterculia f.* nut kernel oil was heated to about 600° F. and allowed to cool immediately, the heat being applied and withdrawn at the proper time so that the temperature would not go beyond the point desired. Sometimes carbonaceous material is formed, but this can be strained out. This application of heat causes a polymerization of the oil and the resulting product is a thin, syrupy, light colored liquid which can be applied either with or without a thinner. It is to be noted that when carbonization does occur and this is filtered out there is no discoloration of the polymerized oil.

(1) This heat polymerized oil can be set at a temperature of 285° F. to 300° F. in one hour on paper. The resulting film when cooled to room temperature is perceptibly tacky and this tackiness continues indefinitely. But it is noted, and will be again noted and stressed, that the products of the present invention have unusually long life at normal and at increased temperatures. The color of this product is so light and clear that kraft paper coated therewith is made translucent.

(2) The *Sterculia f.* oil polymerized at about 600° F. can be set to a hard film at 400° F. in about one-half hour. (3) *Sterculia f.* oil polymerized at about 600° F. with about 3 to 5 percent of manganese resinate added as a drier and applied as a film on kraft paper sets at about 285° F. to a film which is strong and hard and which has a barely perceptible tackiness. By setting at high temperatures, 325° to 600° F., the products of Examples (1), (2) and (3) can be formed into films of varying degrees of hardness ranging up to a glossy, glass-like finish. In all of these examples the product has a high degree of flexibility and in each case the color is very light and clear. Another notable characteristic in the absence of odor such as is present in linseed and china wood oil films. This is very desirable in coatings for food containers and wrappers.

In the Example (3) given above, driers other than manganese resinate can be used such for example as lead oxide, cobalt resinates and oleates, copper oleate, carbonates of these metals, and other commercial driers.

Another product of the invention is one which is particularly suitable for making films on sheet metal. This product (4) is formed by coating metal with the raw oil from the kernel of the *Sterculia f.* and heating to 350 to 400° F. (or even as high as 500° F. or higher) at which temperature the coating sets into a hard glossy flexible film which is very light and clear in color and has an extremely long life and resistance to chemicals and solvents such as alcohol, acetic acid, petroleum oils, benzol and so on.

Another way of making a similarly light colored and clear product (5) is to heat the *Sterculia f.* kernel oil to 350° to 400° F. and hold it at that temperature to thicken the oil, the heating being discontinued before the oil gets too thick. Also the oil, at the proper point of thickening, can be thinned with a petroleum such as varnoline or other common solvent vehicle, in which case the oil can be polymerized to a thicker state (5a) than when a thinner is not used. Driers, for example, such as those elsewhere herein named, can be used with products (4) and (5), (5a) when desired, in amounts about 1% to 10% or more to meet conditions in which the products are to be applied and used, and the drying times and temperatures can be governed accordingly. When a thinner is used the latter can be added at about 350° to 400° F., varnoline, for example, being suited for addition at this temperature.

Sterculia oil can be mixed or blended with other materials such as drying oils (for example, linseed oil and china wood oil), fossil resins (for example, congo, kauri, East India), pitches and waxes to modify the body thereof to meet certain requirements, and these materials can be added into the products of Examples 1 to 5a given above, and those given hereinafter.

On account of the lightness and clearness of the color the products of the invention, particularly those above set forth in detail, can be pigmented to make paints, colored lacquers and for other purposes.

The products of the invention in addition to being suitable for coating purposes are useful in making impregnations and molded compositions, in the latter case fillers can be used such as lime, cement, barytes, slate dust, iron oxide, lead oxide, and so on, the filler in some cases serving also as a drier or setting material.

The products of the invention are suited for coating sheet metal such as copper, sheet iron and tin plate and have, among others, the advantage of pliability whereby it lends itself to the drawing of the metal after the coating has been formed and set thereon such, for example, as in the making of tin caps for containers and the like. These products have the advantage that they can be applied for use generally over printed matter on containers and other objects, the lightness and clearness or its color permitting the printing to be clearly seen through the coating or film. The resistance to the action of chemicals and solvents, the lack of odor, and the long life of the products of the invention further enhance their value for coating food containers.

The products of the invention, particularly those above set forth and described, are suitable for use in electrical insulation and have the particular advantage of having long life and being strong and flexible, except of course in the case of molded compositions of the kind which are firm and solid throughout. For electrical insulation the Examples 1 to 5a above given and also the modifications thereof and the other compositions above set forth are useful.

In the making of any or all of the products of the invention either the kernel oil alone, the oil of the pulpy covering which occurs about the outer surface of the hard shell of the kernel, or a mixture of both of these oils can be used.

The natural color of the oil of the nut of *Sterculia f.* is a very light yellow and in some of the examples above cited an applied film is practically colorless, in others the color is a light transparent yellow. To produce a water-white color I treat the oil with an acid such as nitric acid or pass it through fuller's earth or a diatomaceous earth. For most cases, however, bleaching is not necessary because of the light and transparent color of the oil and of the products made therefrom.

Having thus described my invention, what I claim and desire to protect by Letters Patent is:

1. A composition of matter obtained by heating the oil of the nut of *Sterculia foetida* at a temperature range between 100° and 650° F. and discontinued before the polymerized oil reaches the rubbery state.

2. The method which comprises heating the oil of the nut of *Sterculia foetida* at a temperature range between 100° F. and 650° F. and discontinuing the heating to produce a state of polymerization below the rubbery state when the mass is cooled.

3. A web of fibrous material having applied thereto a coating composition obtained by heating the oil of the nut of the *Sterculia foetida* at a temperature range between 100° F. and about 650° F. and discontinued before the polymerized oil reaches the rubbery state.

MORTIMER T. HARVEY.